(12) United States Patent
Kozono et al.

(10) Patent No.: US 11,715,903 B2
(45) Date of Patent: Aug. 1, 2023

(54) CONNECTOR INCLUDING A ROTATBLE CONNECTION MEMBER

(71) Applicant: YAZAKI CORPORATION, Tokyo (JP)

(72) Inventors: Seiji Kozono, Kakegawa (JP); Yoshitaka Tsushima, Fujieda (JP); Masaya Okamoto, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 8 days.

(21) Appl. No.: 17/710,988

(22) Filed: Mar. 31, 2022

(65) Prior Publication Data

US 2022/0320782 A1    Oct. 6, 2022

(30) Foreign Application Priority Data

Apr. 5, 2021   (JP) ................................ 2021-064303

(51) Int. Cl.
*H01R 13/453*   (2006.01)
*H01R 35/04*    (2006.01)

(52) U.S. Cl.
CPC ......... *H01R 13/4532* (2013.01); *H01R 35/04* (2013.01)

(58) Field of Classification Search
CPC .............. H01R 13/453; H01R 13/4532; H01R 13/4536; H01R 35/04
USPC ....................................................... 439/140
See application file for complete search history.

(56) References Cited

U.S. PATENT DOCUMENTS

| | | | | |
|---|---|---|---|---|
| 4,176,897 A * | 12/1979 | Cameron | ............... | H01R 13/44 439/138 |
| 5,372,515 A * | 12/1994 | Miller | ............... | H01R 13/6485 439/138 |
| 5,716,224 A * | 2/1998 | Masuda | ............ | H01R 13/4536 439/138 |
| 6,520,782 B2 * | 2/2003 | Mori | ...................... | B60L 53/16 439/138 |
| 6,685,362 B2 * | 2/2004 | Burkholder | .......... | G02B 6/3849 439/607.34 |
| 6,877,999 B2 * | 4/2005 | Hashimoto | ........ | H01R 13/4532 439/138 |
| 6,887,086 B2 * | 5/2005 | Kuroki | ............... | H01R 13/4532 439/138 |

(Continued)

FOREIGN PATENT DOCUMENTS

JP        H08-138785 A      5/1996

*Primary Examiner* — Harshad C Patel
(74) *Attorney, Agent, or Firm* — Kenealy Vaidya LLP

(57) ABSTRACT

A connector includes a housing configured to accommodate a connection terminal, a shutter that is rotatably provided in the housing and is configured to open and close a front opening of the housing, a rotation arm that is rotatably supported to the housing about a rotation axis and has an arm portion and a connection engagement portion, and a connection member that is provided so as to be rotatable together with the shutter and includes a first lever portion that is pressed and rotated by a tip end of the connection engagement portion. A pressing force of the mating connector acts on the arm portion so as to rotate the rotation arm, and thus the shutter is rotated together with the connection member rotated by the connection engagement portion so as to open the front opening.

3 Claims, 9 Drawing Sheets

(56) References Cited

U.S. PATENT DOCUMENTS

| | | | |
|---|---|---|---|
| 6,908,319 B2 * | 6/2005 | Sasame | H01R 13/4536 |
| | | | 439/137 |
| 6,935,873 B2 * | 8/2005 | Funatsu | H01R 13/4532 |
| | | | 439/137 |
| 7,140,892 B2 * | 11/2006 | Takeuchi | H01R 13/6583 |
| | | | 439/138 |
| 8,770,860 B2 * | 7/2014 | Affre De Saint Rome | |
| | | | H01R 13/5213 |
| | | | 439/138 |
| 10,348,026 B1 | 7/2019 | Cheng et al. | |
| 10,355,390 B2 * | 7/2019 | Ferran Palau | H01R 13/629 |
| 2020/0031235 A1 | 1/2020 | Song et al. | |

* cited by examiner

CONNECTOR INCLUDING A ROTATBLE CONNECTION MEMBER

CROSS-REFERENCE TO RELATED APPLICATIONS

This application is based on and claims priority under 35 USC 119 from Japanese Patent Application No. 2021-064303 filed on Apr. 5, 2021, the contents of which are incorporated herein by reference.

TECHNICAL FIELD

The present invention relates to a connector including a shutter mechanism.

BACKGROUND ART

In related art, a wire harness (electric wire) for electrically connecting various electrical components mounted on an automobile or the like performs connection by a connector. Such a connector is usually constituted by a male connector and a female connector. For example, in the case of a connector structure applied to optional specifications, one connector connected to an end portion of an electric wire has a shutter mechanism at a front opening of a housing of the one connector for purposes such as dust prevention, terminal protection, prevention of electric shock to the surroundings, and the like until the other connector is fitted to the one connector. In particular, a shutter-mechanism-equipped connector (inlet) is used in an electric vehicle or the like in order to prevent an electric shock accident or the like, and exposure of a terminal at a front opening of the connector when the connector is not connected to a mating connector. As an example of such a configuration, JP-A-H8-138785 discloses a shutter-mechanism-equipped connector, for example.

According to the shutter-mechanism-equipped connector, one connector has a shutter that rotates outward when an external force is applied to a front surface portion thereof, the other connector is provided with a tip end portion such that the tip end portion presses the front surface portion of the shutter of the one connector to rotate the shutter when fitting the connector.

Incidentally, in the shutter-mechanism-equipped connector disclosed in JP-A-H8-138785, when fitting with the connector, a tip end portion (fitting hood portion) of a mating connector pushes the front surface portion of the shutter, so that the shutter is rotated outward (forward) around a pin and is opened. Therefore, it is necessary to set a stroke (connector size) of the mating connector in consideration of an opening rotation trajectory of the shutter so as to avoid interference when fitting with the connector. Therefore, the fitting hood portion of the mating connector is lengthened due to space for the shutter to open and close, and thus the connector size is increased.

Further, according to the shutter-mechanism-equipped connector, the shutter is rotated and opened by a pressing force in a connector fitting direction of the mating connector, and thus a terminal in the connector is opened and exposed to enable coupling with a mating terminal. Therefore, when fitting the connector, rotation resistance against rotation of the shutter is applied in addition to insertion resistance when coupling the terminal and the mating terminal, and thus a force for fitting the connector is increased.

SUMMARY OF INVENTION

The present invention has been made in view of the above circumstances, and an object thereof is to reduce a force for fitting a connector of a shutter-mechanism-equipped connector and to provide a compact connector.

The above object of the present invention is achieved by the following configurations.

Aspect of non-limiting embodiments of the present disclosure relates to provide a connector including:

a housing configured to accommodate a connection terminal;

a shutter that is rotatably provided in the housing and is configured to open and close a front opening of the housing to which a fitting tip end portion of a mating connector is to be fitted;

a rotation arm that is disposed on one side portion side of the front opening and is rotatably supported to the housing about a rotation axis intersecting a connector fitting direction of the mating connector, the rotation arm including an arm portion that extends toward a front side of the housing relative to the rotation axis, and a connection engagement portion that extends toward another side portion side of the front opening relative to the rotation axis; and a connection member that is provided so as to be rotatable together with the shutter and includes a first lever portion that is pressed and rotated by a tip end of the connection engagement portion, in which a pressing force of the mating connector, whose fitting tip end portion is moved to a position facing the front opening, acts on the arm portion so as to rotate the rotation arm, and thus the shutter is rotated together with the connection member rotated by the connection engagement portion so as to open the front opening.

According to the connector having the above configuration, when the mating connector is moved to the position where the fitting tip end portion faces the front opening of the housing when fitting the connector, a side surface portion of the mating connector presses the arm portion so as to rotate the rotation arm. Then, the rotated rotation arm rotates the shutter integrally with the connection member whose first lever portion is rotated by the tip end of the connection engagement portion so as to open the front opening of the housing. Therefore, if the mating connector is moved toward the front opening along the connector fitting direction while the side surface portion presses the arm portion to maintain an opening state of the shutter, a mating connection terminal of the mating connector can be fitted to the connection terminal in the front opening of the housing.

At this time, since the rotation arm rotates the shutter via the connection member, a pressing force with which the side surface portion of the mating connector presses the arm portion is smaller than a pressing force with which a fitting tip end portion of a mating connector in related art directly presses a front surface portion of a shutter.

Therefore, although insertion resistance when coupling the connection terminal and the mating connection terminal acts on the mating connector moving in the connector fitting direction when fitting the connector, rotation resistance against rotation of the shutter has almost no effect, and thus a force for fitting the connector is lower than that in the related art.

In addition, according to the connector of the present configuration, it is not necessary to lengthen a fitting hood portion of the mating connector in consideration of opening and closing trajectories of the shutter as in the shutter-mechanism-equipped connector in the related art.

According to the present invention, it is possible to reduce the force for fitting the connector of the shutter-mechanism-equipped connector and provide the compact connector.

The present invention has been briefly described above. Further, details of the present invention will be further clarified by reading through an embodiment described below (hereinafter referred to as the "embodiment") with reference to the accompanying drawings.

DESCRIPTION OF EMBODIMENTS

Hereinafter, an example of an embodiment according to the present invention will be described with reference to the drawings.

Figure 1:
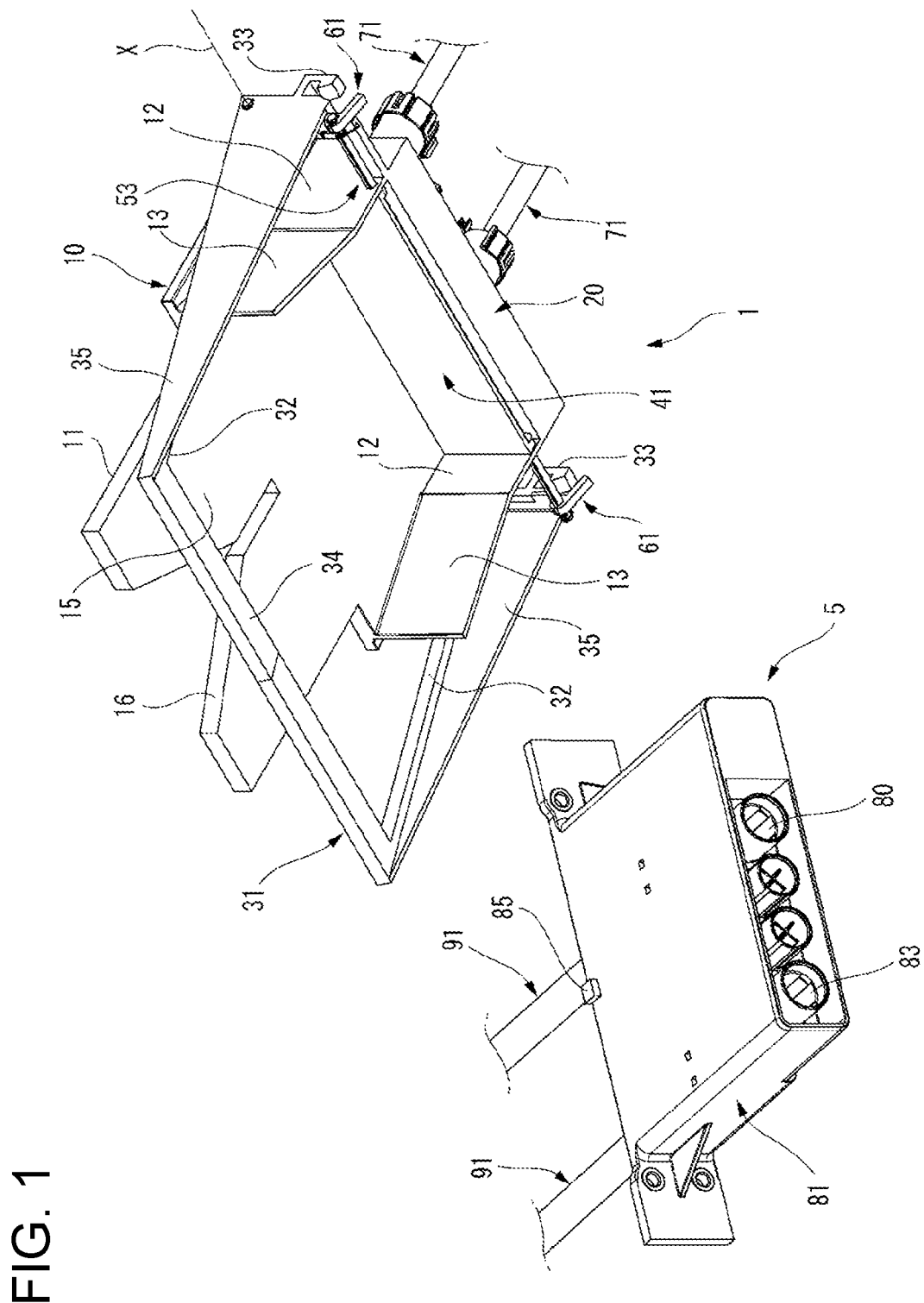
FIG. 1 is a perspective view showing an inlet constituting a connector according to an embodiment of the present invention and an inlet plug that is a mating connector to be fitted to the inlet.
Figure 2:
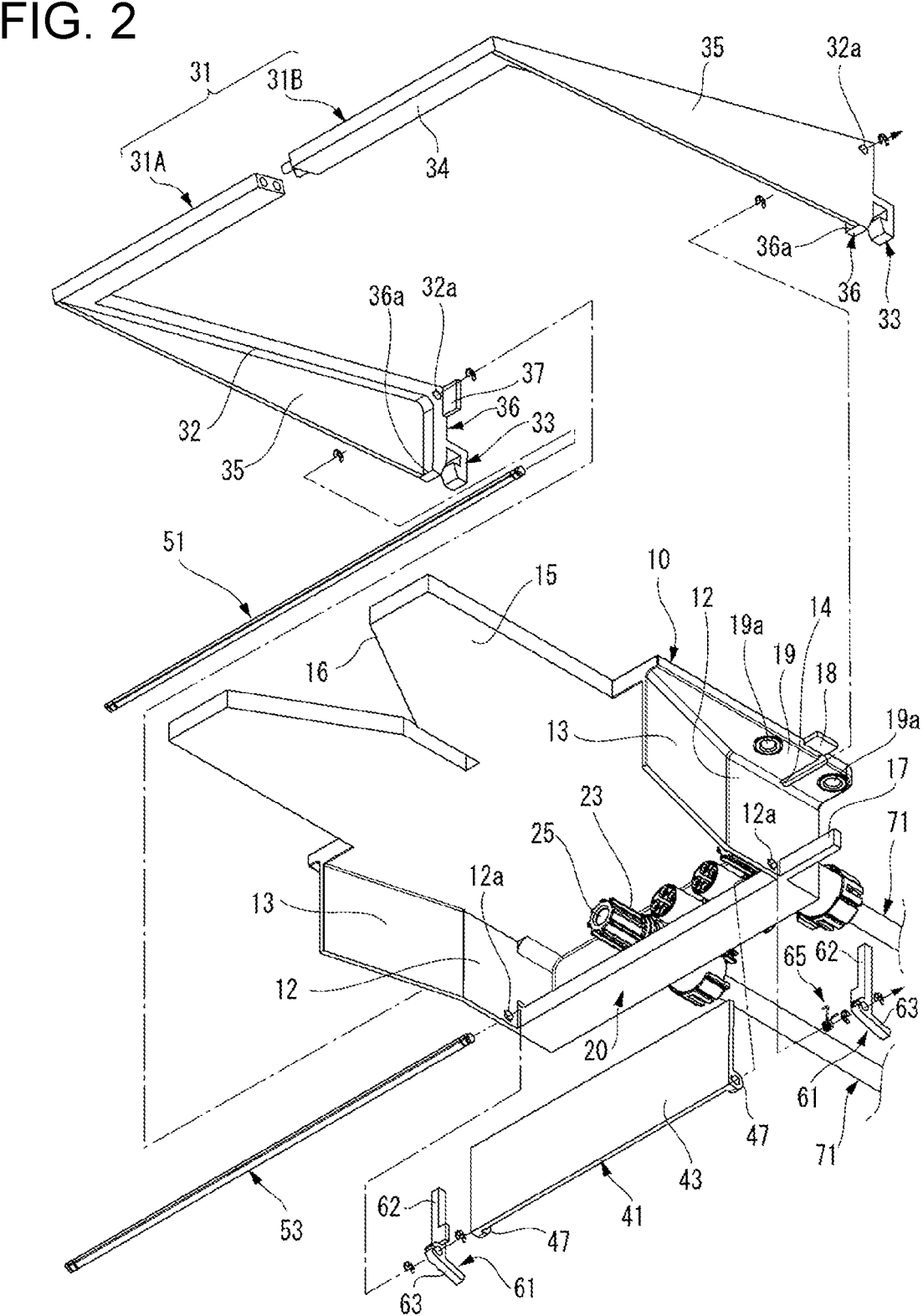
FIG. 2 is an exploded perspective view of the inlet.
Figure 3:
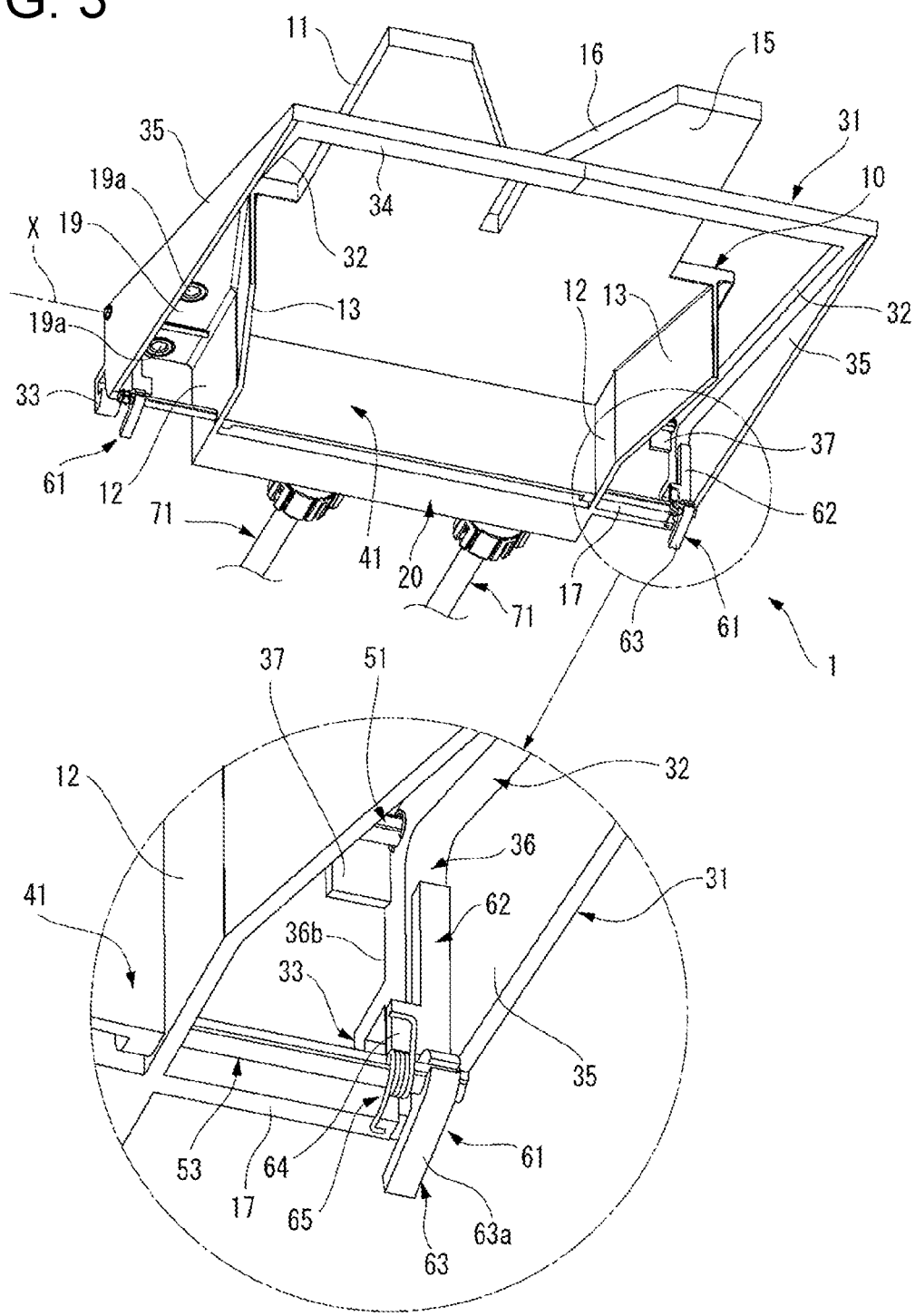
FIG. 3 is a perspective view and a main part enlarged view of the inlet shown in FIG. 1.

FIG. 1 is a perspective view showing an inlet 1 constituting a connector according to the embodiment of the present invention and an inlet plug 5 that is a mating connector to be fitted to the inlet 1. FIG. 2 is an exploded perspective view of the inlet 1. FIG. 3 is a perspective view and a main part enlarged view of the inlet 1 shown in FIG. 1.

As shown in FIG. 1, the inlet 1, which is the connector according to the present embodiment, includes a housing 10. A plug housing 80 of the inlet plug (mating connector) 5 is fitted to the housing 10. As a result, a connection terminal 70 accommodated in the inlet 1 and a mating connection terminal 90 accommodated in the inlet plug 5 are electrically connected to each other.

In the present specification, a front-rear direction is a direction along a connector fitting direction (left-right direction in FIG. 4) of the housing 10, a side where the plug housing 80 of the inlet plug 5 is fitted is defined as a front side, an up-down direction is a direction that is orthogonal to the connector fitting direction of the housing 10 and in which a shutter 41 is opened and closed (up-down direction in FIG. 4), and a side where an upper wall portion 11 of the housing 10 is located is defined as an upper side.

As shown in FIGS. 1 to 3, the inlet 1 includes the housing 10, a rotation arm 31, a shutter 41, and a connection member 61.

The housing 10 of the present embodiment is formed of an electrically insulating synthetic resin. As shown in FIG. 2, the housing 10 includes the rectangular upper wall portion 11, a pair of side wall portions 12 extending downward from two edge portions of the upper wall portion 11, and a terminal accommodating portion 20 provided in a central portion of the housing 10. The terminal accommodating portion 20 is provided with a pair of terminal accommodating cylindrical portions 23, 23 protruding toward the inlet plug 5.

The connection terminal 70, which is connected to a terminal portion of a high-voltage cable 71, is accommodated in each terminal accommodating cylindrical portion 23. A front surface opening 25, which is a front opening into which the mating connection terminal 90 of the inlet plug 5 is inserted, is formed in a front end of each terminal accommodating cylindrical portion 23. The high-voltage cable 71 connected to the connection terminal 70 is drawn out from a rear end opening of each terminal accommodating cylindrical portion 23.

The connection terminal 70 is a female terminal formed of a conductive metal material, and is constituted by a plurality of flexible pieces arranged in a cylindrical shape. A joining hole 72 is formed in a rear end portion of the connection terminal 70. A conductor 73 of the high-voltage cable 71 drawn out from the rear end opening of the terminal accommodating cylindrical portion 23 is inserted into the joining hole 72, crimped and connected thereto (see FIGS. 8 and 9).

A seal member 75 is mounted to the high-voltage cable 71 drawn out from the rear end opening of the terminal accommodating cylindrical portion 23, and thus the high-voltage cable 71 is liquid-tightly sealed relative to the terminal accommodating cylindrical portion 23. Detachment of the seal member 75 is restricted by a rear holder 77 mounted to a rear end of the terminal accommodating cylindrical portion 23 (see FIGS. 8 and 9).

Guide walls 13 that extend forward from front edges of the pair of side wall portions 12 are provided on a front portion of the terminal accommodating portion 20. A pair of the guide walls 13 are configured such that a distance therebetween gradually increases toward the front. The pair of guide walls 13 guide insertion of a fitting tip end portion of the plug housing 80 to be fitted toward the terminal accommodating portion 20.

Further, in the housing 10, an extension portion 15 is provided to extend in front of the upper wall portion 11. A fitting guide groove 16 extending in the connector fitting direction over the extension portion 15 is formed in a central portion of the upper wall portion 11. The fitting guide groove 16 has a tapered portion whose width increases toward the inlet plug 5. When the inlet plug 5 is fitted to the inlet 1, the fitting guide groove 16 is engaged with a pick-up rib 85 provided to protrude from an upper surface of the plug housing 80, so that the plug housing 80 can be fitted and guided to the housing 10.

An arm support hole 14 extending in a left-right direction of the housing 10 is formed to penetrate the rear of the upper wall portion 11. A rotation support pin 51 that is rotatably inserted into the arm support hole 14 supports the rotation arm 31 in a freely openable and closable manner relative to the housing 10. The rotation support pin 51 is a pin whose cross-section has a keyhole shape (a shape in which a circle and a square are connected) in which a part of an outer peripheral surface protrudes along a longitudinal direction.

The housing 10 includes fixing portions 19 protruding laterally on the upper wall portion 11. Hole portions 19a through which attachment screws (not shown) pass are formed in the fixing portions 19. Further, a stopper portion 18 that engages with a locking piece 37 of the rotation arm 31 so as to regulate rotation is provided at a tip end of each fixing portion 19.

A shutter support hole 12a into which a rotation support pin 53 for supporting the shutter 41 in an openable and closable manner is rotatably inserted is formed in a front end of a lower edge of each of the two side wall portions 12 of the housing 10. The rotation support pin 53 is a pin whose cross-section has a keyhole shape (a shape in which a circle and a square are connected) in which a part of an outer peripheral surface protrudes along a longitudinal direction.

A spring locking protrusion 17 is provided to protrude outward in the vicinity of the shutter support hole 12a of one (right one in FIG. 2) side wall portion 12 of the housing 10.

As shown in FIG. 2, the rotation arm 31 of the present embodiment is constituted by combining a pair of arm members 31A and 31B, and is a U-shaped arm member including a pair of arm portions 32 extending in the front-rear direction of the housing 10 from two end portions of a connection portion 34 extending in the left-right direction of the housing 10.

The rotation arm 31 is pivotally supported in a rotatable manner by the arm support hole 14 of the housing 10 via the rotation support pin 51 that is fitted into a fitting hole 32a formed in a rear end of each arm portion 32. The fitting hole 32a is a keyhole-shaped opening corresponding to the rotation support pin 51. The rotation support pin 51 fitted into the fitting hole 32a rotates integrally with the rotation arm 31.

The arm support hole 14 is formed in the upper wall portion 11 located on one side portion side (upper side portion side) of the front surface opening 25 in the terminal accommodating cylindrical portion 23. Therefore, the rotation arm 31 is arranged on the upper side portion side of the front surface opening 25 and is rotatably supported relative to the housing 10 about a rotation axis X (center line of the rotation support pin 51) that intersects the connector fitting direction.

Each arm portion 32 of the rotation arm 31 is configured to extend toward the front of the housing 10 from the rotation axis X (fitting hole 32a). In addition, the rotation arm 31 includes a connection engagement portion 36 that extends toward the other side portion side (lower side portion side) of the front surface opening 25 from the fitting hole 32a (rotation axis X) formed in the rear end of the arm portion 32.

That is, the rotation arm 31 is disposed on the upper side portion side of the front surface opening 25 and is rotatably supported relative to the housing 10 about the rotation axis X intersecting the connector fitting direction of the inlet plug 5. The rotation arm 31 includes the arm portion 32 that extends toward the front of the housing 10 relative to the rotation axis X, and the connection engagement portion 36 that extends toward the lower side portion side of the front surface opening 25 relative to the rotation axis X. A reinforcing wall 35 is provided at an inner corner of a triangle defined by the arm portion 32 and the connection engagement portion 36.

The pair of arm portions 32 whose front end portions are connected to each other by the connection portion 34 have a gap therebetween, which is wider than a left-right direction width of the upper wall portion 11. Therefore, the rotation arm 31 pivotally supported via the rotation support pin 51 that is rotatably inserted into the arm support hole 14 of the housing 10 is in a state where the connection portion 34 is vertically swingable in front of the extension portion 15.

In addition, in a state where no rotational force is applied, the rotation arm 31 that is rotated downward due to own weight is restricted from rotating in a state where a tip end side thereof is inclined so as to protrude obliquely downward of the extension portion 15 since the locking piece 37 is engaged with the stopper portion 18 of the housing 10.

When the tip end side of the rotation arm 31 (arm portion 32) is rotated upward, a tip end 36a of the connection engagement portion 36 presses and rotates a first lever portion 62 of the connection member 61 to be described later.

A rear surface 36b of the connection engagement portion 36 is provided with a hook-like auxiliary engagement portion 33 whose tip end is formed to extend downward.

As shown in FIG. 2, the shutter 41 of the present embodiment includes a cover portion 43 that has a rectangular flat plate shape, and rotation support portions 47 provided to protrude below inner surfaces of two left-right direction end portions of the cover portion 43.

Each rotation support portion 47 is pivotally supported in a freely rotatable manner via the rotation support pin 53 that is rotatably inserted into the shutter support hole 12a of each side wall portion 12 of the housing 10, and thus serves as a rotation center of the cover portion 43 rotated in an opening and closing direction. A fitting hole of each rotation support portion 47 is a keyhole-shaped opening corresponding to the rotation support pin 53. The rotation support pin 53 fitted into the fitting hole rotates integrally with the shutter 41.

Since the cover 43 covers the front surface opening 25 of each terminal accommodating cylindrical portion 23 of the terminal accommodating portion 20, the shutter 41 can prevent the connection terminal 70 from being exposed in the front surface opening 25 when the inlet 1 is not connected.

As shown in FIGS. 2 and 3, the connection member 61 of the present embodiment is provided to be rotatable integrally with (together with) the shutter 41, and is engaged with the connection engagement portion 36 of the rotation arm 31 (arm portion 32) so as to rotate the shutter 41 in conjunction with rotation of the rotation arm 31 (arm portion 32). The connection member 61 is disposed on each of left and right sides of the shutter 41 outside the two side wall portions 12 of the housing 10. Such connection members 61 are respectively connected to two end portions of the second connection pin 53 inserted into the shutter support hole 12a of each side wall portion 12, and are synchronously operated in conjunction with the rotation of the rotation arm 31 (arm portion 32). A fitting hole of each connection member 61 connected to the second connection pin 53 is a keyhole-shaped opening corresponding to the second connection pin 53. The second connection pin 53 fitted into the fitting hole rotates integrally with the connection member 61.

The connection member 61 includes the first lever portion 62 that extends outward in a radius direction relative to the fitting hole into which the second connection pin 53 is fitted, a second lever portion 63 that sandwiches the tip end 36a of the connection engagement portion 36 of the rotation arm 31 (arm portion 32) with the first lever portion 62 and extends outward in a rotation radius direction different from that of the first lever portion 62, and a spring engagement portion 64 formed on a base portion of the first lever portion 62.

As shown in FIG. 3, in a state where the first lever portion 62 is inclined such that the tip end side of the rotation arm 31 (arm portion 32) protrudes obliquely downward of the eave portion 15 without being applied with any rotational force, a side surface 62a is aligned with a front surface of the connection engagement portion 36 so as to be abutted thereon. When the tip end side of the rotation arm 31 (arm portion 32) is rotated upward, the side surface 62a of the first lever portion 62 is pressed and rotated by the tip end 36a of the connection engagement portion 36.

In a state where the second lever portion 63 is inclined such that the tip end side of the rotation arm 31 (arm portion 32) protrudes obliquely downward of the extension portion 15 without being applied with any rotational force, the second lever portion 63 protrudes toward a lower side of the connection engagement portion 36. When the tip end side of the rotation arm 31 (arm portion 32) is rotated upward, a side surface 63a of the second lever portion 63 is pressed and rotated by the auxiliary engagement portion 33 of the connection engagement portion 36.

Therefore, when the connection member 61 of the present embodiment is rotated upward from the state where the tip end side of the rotation arm 31 (arm portion 32) is inclined so as to protrude obliquely downward, the tip end 36a of the connection engagement portion 36 presses the first lever portion 62, so that the connection member 61 is rotated by a predetermined rotation angle. When the tip end side of the rotation arm 31 (arm portion 32) is further rotated upward, the auxiliary engagement portion 33 of the connection engagement portion 36 presses the second lever portion 63, so that the connection member 61 is rotated by the predetermined rotation angle or more. The predetermined rotation angle is a rotation angle of the connection member 61 when the first lever portion 62 is detached within a rotation radius from the tip end 36a of the connection engagement portion 36.

The connection member 61 is constantly urged by a torsion coil spring 65, which is an elastic member, in a direction in which the shutter 41 closes the front surface opening 25. The torsion coil spring 65 is fitted into the rotation support pin 53 and is arranged side by side with one (right one in FIG. 3) connection member 61. One end portion of the torsion coil spring 65 is engaged with the spring locking protrusion 17 of each side wall portion 12, and the other end portion is engaged with the spring engagement portion 64 of the connection member 61, so that the connection member 61 is constantly urged in the direction in which the shutter 41 closes the front surface opening 25.

As shown in FIGS. 1 and 2, in the state where the tip end side of the rotation arm 31 (arm portion 32) is inclined obliquely downward, the connection member 61 rotated integrally with the shutter 41 holds the shutter 41 at a position where the cover portion 43 of the shutter 41 intersects the connector fitting direction and covers the front surface opening 25 of the terminal accommodating cylindrical portion 23 in the terminal accommodating portion 20 of the housing 10.

Figure 6:
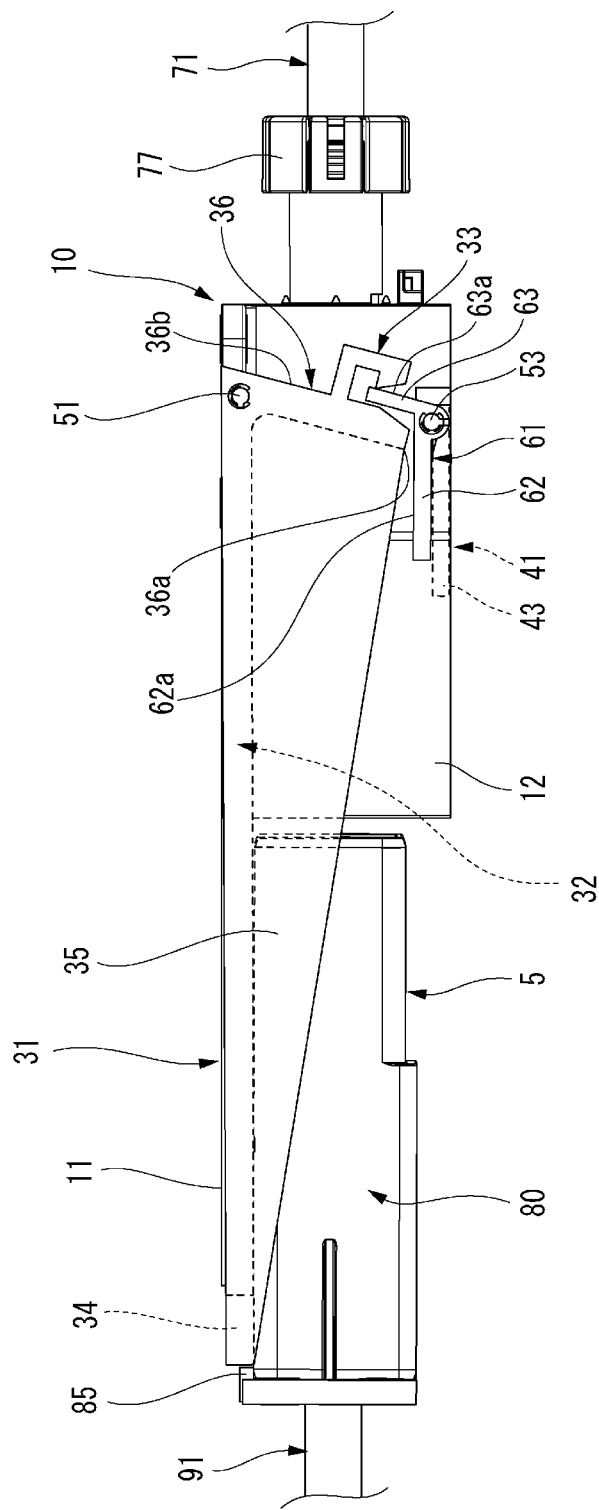
FIG. 6 is a side view showing a state where the inlet and the inlet plug are being fitted to each other.
Figure 7:
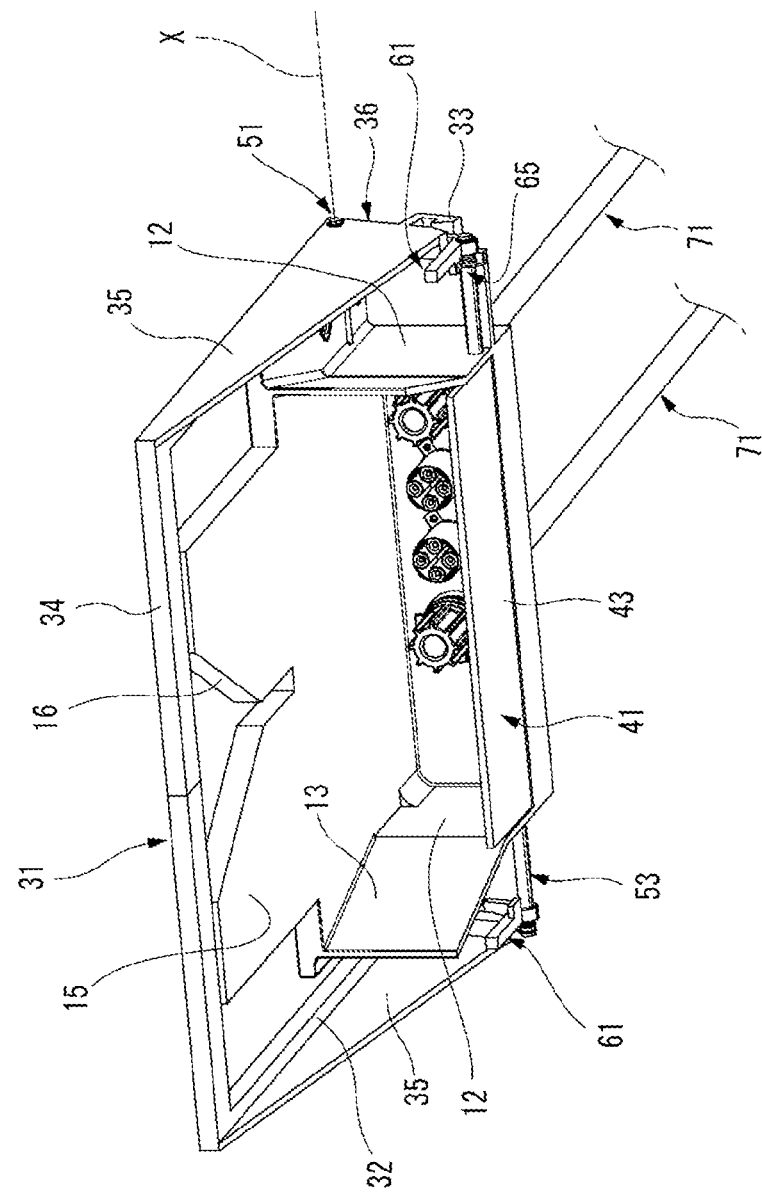
FIG. 7 is a perspective view, in which the inlet plug is omitted, of the inlet during fitting.

In addition, in a horizontal state where the rotation arm 31 (arm portion 32) is parallel to the connector fitting direction, the connection member 61 holds the shutter 41 at a position where the cover portion 43 of the shutter 41 is parallel to the connector fitting direction and the front surface opening 25 of the terminal accommodating cylindrical portion 23 is opened (see FIGS. 6 and 7).

In the assembled inlet 1, the front surface opening 25 of the terminal accommodating portion 20 of the housing 10 is covered by the shutter 41. As a result, the connection terminal 70 is prevented from being exposed at the front surface opening 25 when the inlet 1 is not connected.

The inlet 1 is attached to, for example, a vehicle body of an electric vehicle by a screw inserted into the hole portion 19a of each fixing portion 19 formed in the upper wall portion 11 of the housing 10. Here, the up-down direction of the vehicle body is the up-down direction of the inlet 1 at the time of attachment to the vehicle body.

Figure 8:
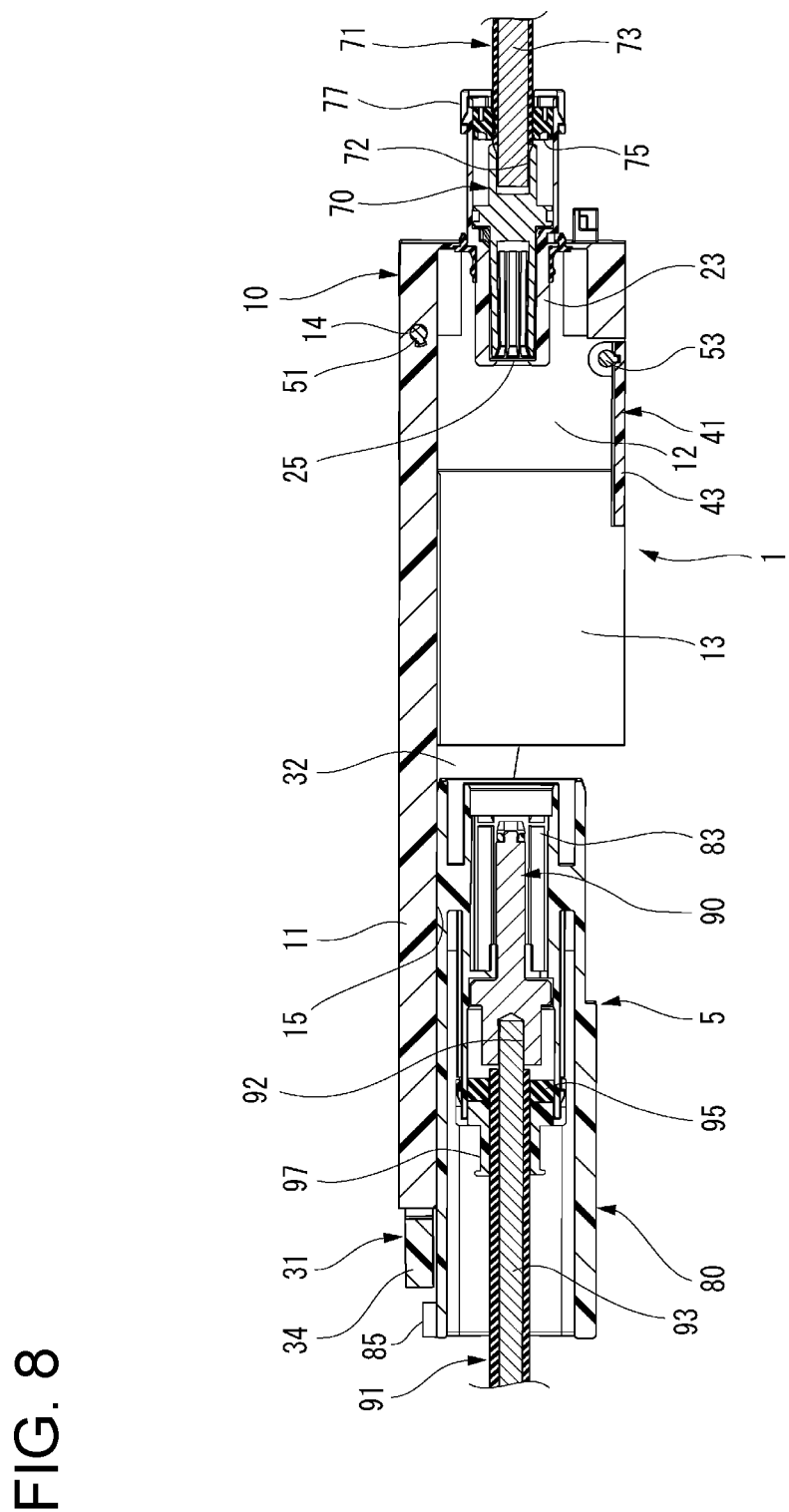
FIG. 8 is a vertical cross-sectional view of a connection terminal portion when the mating connector is moved to a position where a fitting tip end portion faces a front opening of a housing.

As shown in FIGS. 1 and 8, the inlet plug 5 to be fitted and electrically connected to the inlet 1 includes the mating connection terminal 90 to be fitted to the connection terminal 70 of the inlet 1, and the plug housing 80 that includes a pair of terminal accommodating chambers 83 for accommodating the mating connection terminal 90.

The plug housing 80 is formed of an electrically insulating synthetic resin. The pick-up rib 85 is provided to protrude on the upper surface of the plug housing 80. When the inlet plug 5 is fitted to the inlet 1, the pick-up rib 85 is engaged with the fitting guide groove 16 provided in the upper wall portion 11 of the inlet 1, so that the plug housing 80 can be fitted and guided to the housing 10.

The mating connection terminal 90, which is connected to a terminal portion of a high-voltage cable 91, is accommodated in each terminal accommodating chamber 83. The high-voltage cable 91 connected to the mating connection terminal 90 is drawn out from a rear end opening of each terminal accommodating chamber 83.

The mating connection terminal 90 is a male terminal formed of a conductive metal material, and is formed in a cylindrical rod shape. A joining hole 92 is formed in a rear end portion of the mating connection terminal 90. A conductor 93 of the high-voltage cable 91 drawn out from the rear end opening of the terminal accommodating chamber 83 is inserted into the joining hole 92, crimped and connected thereto.

A seal member 95 is mounted to the high-voltage cable 91 drawn out from the rear end opening of the terminal accommodating chamber 83, and thus the high-voltage cable 91 is liquid-tightly sealed relative to the terminal accommodating chamber 83. Detachment of the seal member 95 is restricted by a rear holder 97 mounted to a rear end of the terminal accommodating chamber 83.

Next, a case where the inlet plug 5 is fitted to and detached from the inlet 1 having the above-described configuration will be described.

Figure 4:
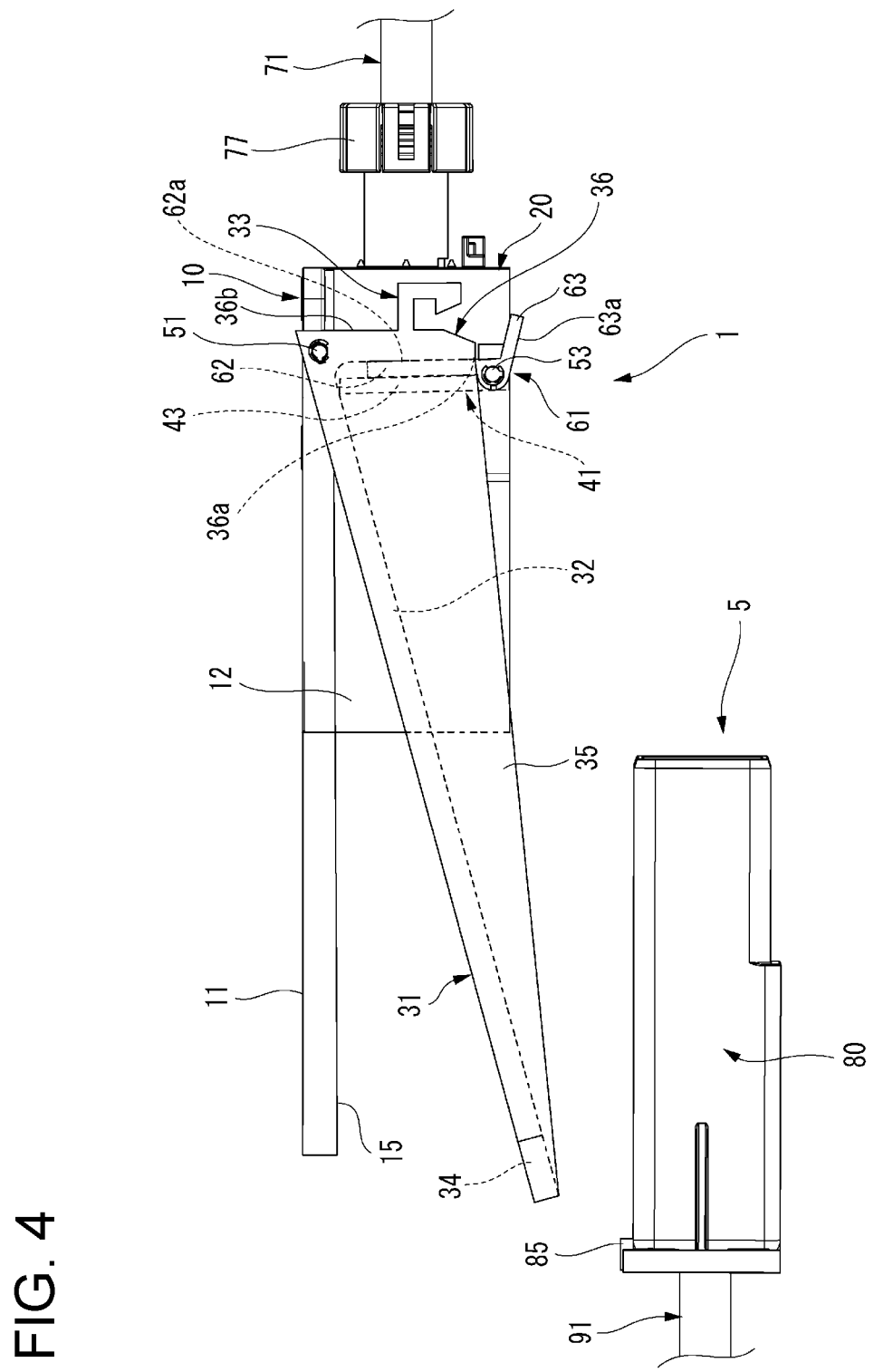
FIG. 4 is a side view showing a state before the inlet and the inlet plug are fitted to each other.
Figure 5:
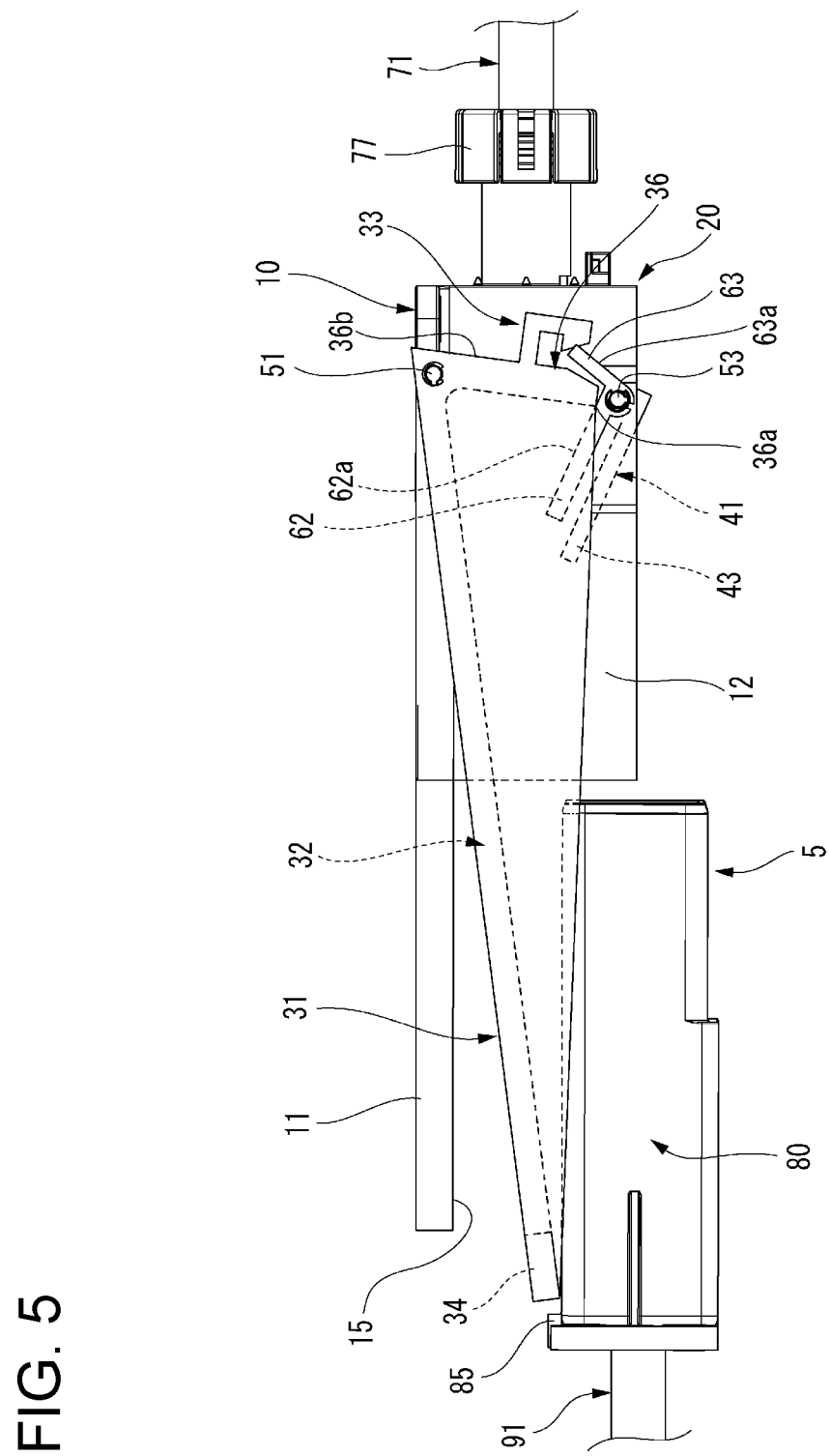
FIG. 5 is a side view showing a state where the inlet and the inlet plug start to be fitted to each other.
Figure 9:
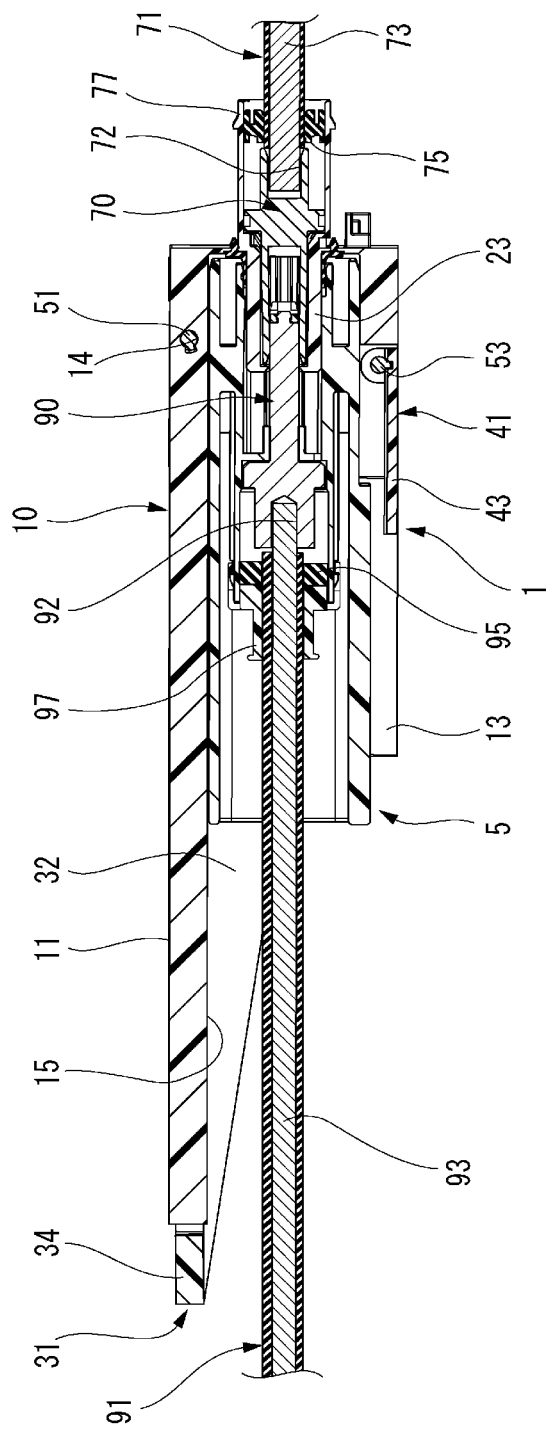
FIG. 9 is a vertical cross-sectional view of the connection terminal portion between the inlet and the inlet plug during fitting.

FIGS. 4 to 6 are side views showing a state before the inlet 1 and the inlet plug 5 are fitted to each other, a state where the fitting is started, and an intermediate state of the fitting. FIG. 7 is a perspective view, in which the inlet plug 5 is omitted, of the inlet 1 during fitting. FIG. 8 is a vertical cross-sectional view of a connection terminal portion when the inlet plug 5 is moved to a position where a fitting tip end portion faces the front surface opening 25 in the housing 10. FIG. 9 is a vertical cross-sectional view of the connection terminal portion between the inlet 1 and the inlet plug 5 during fitting.

(During Fitting)

As shown in FIG. 4, the shutter 41 is disposed in front of the terminal accommodating portion 20 of the housing 10 in a state where the inlet plug 5 is located below the extension portion 15 and the fitting tip end portion of the inlet plug 5 does not face the front surface opening 25 in the housing 10 (see FIG. 1). As a result, the front surface opening 25 of the terminal accommodating portion 20 is in a closed state of being covered by the shutter 41. Therefore, the connection terminal 70 of the inlet 1 is not exposed due to the closing of the shutter 41. As a result, the inlet 1 is subjected to dust prevention and terminal protection, and is prevented from electric shock.

From this state, as shown in FIG. 5, the inlet plug 5 is moved upward until the upper surface of the plug housing 80 comes into contact with and rotates the tip end side (connection portion 34) of the rotation arm 31.

When the tip end side of the rotation arm 31 (arm portion 32) is rotated upward, the tip end 36a of the connection engagement portion 36 presses and rotates the first lever portion 62 of the connection member 61 by the predetermined rotation angle. Therefore, the connection engagement portion 36 of the rotated rotation arm 31 rotates the shutter 41 in an opening direction via the connection member 61.

Further, as shown in FIGS. 6 and 8, the inlet plug 5 is moved upward until the upper surface of the plug housing 80 is abutted against a lower surface of the eave portion 15. As a result, the inlet plug 5 can be moved to the position where the fitting tip end portion faces the front surface opening 25 in the housing 10. Then, the upper surface of the plug housing 80, which is a side surface portion of the inlet plug 5, presses the tip end side (connection portion 34) of the rotation arm 31 so as to rotate the arm portion 32 of the rotation arm 31 to the horizontal state.

When the tip end side of the rotation arm 31 (arm portion 32) is rotated to the horizontal state, the tip end 36a of the connection engagement portion 36 is disengaged from the first lever portion 62 of the connection member 61, and the auxiliary engagement portion 33 is engaged with the second lever portion 63 of the connection member 61. The auxiliary engagement portion 33 of the connection engagement portion 36 presses and rotates the second lever portion 63 of the connection member 61 by a rotation angle necessary for opening the front surface opening 25. Therefore, the rotated rotation arm 31 (arm portion 32) rotates the shutter 41 via the connection member 61 until the shutter 41 is opened. That is, as shown in FIG. 7, the connection engagement portion 36 of the rotated rotation arm 31 rotates the shutter 41 via the connection member 61 so as to open and close the front surface opening 25 in the housing 10.

Next, the inlet plug 5 is moved toward the front surface opening 25 of the terminal accommodating portion 20 along the connector fitting direction while the upper surface of the plug housing 80 presses the rotation arm 31 (connection portion 34) to maintain a state where the shutter 41 is opened.

Then, as shown in FIG. 9, the mating connection terminal 90 of the inlet plug 5 can be fitted to the connection terminal 70 in the terminal accommodating portion 20 of the housing 10. When the connection terminal 70 of the inlet 1 and the mating connection terminal 90 of the inlet plug 5 are fitted and connected to each other, the high-voltage cable 71 and the high-voltage cable 91 are electrically connected to each other.

At this time, since the connection engagement portion 36 of the rotation arm 31 rotates the shutter 41 via the connection member 61, a pressing force with which an upper surface of the inlet plug 5 presses the connection portion 34 of the rotation arm 31 is smaller than a pressing force with which a fitting tip end portion of an inlet plug in related art directly presses a front surface portion of a shutter.

Therefore, although insertion resistance when coupling the connection terminal 70 and the mating connection terminal 90 acts on the inlet plug 5 moving in the connector fitting direction when fitting the connector, rotation resistance against rotation of the shutter 41 has almost no effect, and thus a force for fitting the connector is lower than that in the related art.

In addition, according to the inlet 1 of the present embodiment, it is not necessary to lengthen a fitting hood portion of the inlet plug 5 in consideration of opening and closing trajectories of the shutter 41 as in a shutter-mechanism-equipped connector in the related art.

(During Detachment)

When the inlet plug 5 is pulled out from the inlet 1 in order to detach the inlet plug 5 from the inlet 1, the mating connection terminal 90 of the inlet plug 5 is pulled out from the connection terminal 70 of the inlet 1. As a result, the electrical connection between the high-voltage cable 71 and the high-voltage cable 91 is released.

When the inlet plug 5 is pulled out, the upper surface of the plug housing 80 pressing the connection portion 34 of the rotation arm 31 upward is separated from the rotation arm 31 (arm portion 32). Therefore, as shown in FIG. 4, the rotation arm 31 that is rotated downward due to own weight is in a state where the rotation arm 31 is inclined such that the tip end side thereof protrudes below the extension portion 15 since the locking piece 37 is engaged with the stopper portion 18 of the housing 10.

Therefore, the inlet 1 is in a closed state where the front surface opening 25 in the housing 10, which has been opened, is covered by the shutter 41. Therefore, the connection terminal 70 of the inlet 1 is not exposed due to the closing of the shutter 41, thus the inlet 1 is subjected to dust prevention, terminal protection and is prevented from electric shock.

As described above, according to the inlet 1 according to the present embodiment, a rotation angle necessary for the shutter 41 to open and close the front surface opening 25 is larger than the predetermined rotation angle of the first lever portion 62. Therefore, when the tip end 36a of the connection engagement portion 36 presses the first lever portion 62 so as to rotate the connection member 61 by the predetermined rotation angle, the first lever portion 62 comes off within a rotation radius from the tip end 36a of the connection engagement portion 36, and the tip end 36a of the connection engagement portion 36 cannot further press the first lever portion 62 to rotate the connection member 61.

However, according to the inlet 1 of the present embodiment, the auxiliary engagement portion 33 of the connection engagement portion 36 presses the second lever portion 63 so as to rotate the connection member 61 by the predetermined rotation angle or more, so that the arm portion 32 of the rotation arm 31 can rotate the shutter 41 by the rotation angle necessary for opening and closing the front surface opening 25 via the connection member 61.

It should be noted that the second lever portion 63 of the connection member 61 can be omitted if the predetermined rotation angle of the first lever portion 62 is made equal to the rotation angle necessary for the shutter by changing shapes of the first lever portion 62 of the connection member and the connection engagement portion 36.

In addition, according to the inlet 1 according to the present embodiment, the shutter 41 is urged in the direction for closing the front surface opening 25 via the connection member 61 constantly urged by the torsion coil spring 65. The connection member 61 constantly urged by the torsion coil spring 65 is constantly in contact with the tip end 36a of the connection engagement portion 36 without any gap. Therefore, when the connection portion 34 of the rotation arm 31 is pressed against the upper surface of the plug housing 80 and the rotation arm 31 (arm portion 32) is rotated, the connection engagement portion 36 can quickly rotate the shutter 41 via the connection member 61.

Therefore, according to the inlet 1 according to the present embodiment, it is possible to reduce a force for fitting the connector and provide a compact connector.

It should be noted that the present invention is not limited to the above-described embodiment, and modifications, improvements, and the like can be made as appropriate. In addition, materials, shapes, dimensions, numbers, arrangement positions, and the like of the respective constituent elements in the above-described embodiment are set as desired and are not limited as long as the present invention can be achieved.

Although the inlet used in an electric vehicle or the like has been described as an example of a shutter-mechanism-equipped connector in the above embodiment, the connector of the present invention is not limited thereto. The present invention can be applied to various connectors based on the spirit of the present invention.

Here, features of the embodiment of the connector according to the present invention described above will be briefly summarized and listed in the following [1] to [3].

[1] A connector (inlet 1) includes: a housing (10) configured to accommodate a connection terminal (70);

a shutter (41) that is rotatably provided in the housing (10) and is configured to open and close a front opening of the housing (10) to which a fitting tip end portion of a mating connector (inlet plug 5) is to be fitted;

a rotation arm (31) that is disposed on one side portion side of the front opening and is rotatably supported relative to the housing (10) about a rotation axis (X) intersecting a connector fitting direction of the mating connector (inlet plug 5), the rotation arm (31) including an arm portion (32) that extends toward a front side of the housing (10) relative to the rotation axis (X), and a connection engagement portion (36) that extends toward another side portion side of the front opening relative to the rotation axis (X); and a connection member (61) that is provided so as to be rotatable together with the shutter (41) and includes a first lever portion (62) that is pressed and rotated by a tip end (36a) of the connection engagement portion (36), in which a pressing force of the mating connector (inlet plug 5), whose fitting tip end portion is moved to a position facing the front opening, acts on the arm portion (32) so as to rotate the rotation arm (31), and thus the shutter (41) is rotated together with the connection member (61) rotated by the connection engagement portion (36) so as to open the front opening.

[2] The connector (inlet 1) according to [1], in which the connection member (61) includes a second lever portion (63) that is disposed so that the tip end (36a) of the connection engagement portion (36) is located between the first lever portion (62) and the second lever portion (63) and extends outward in a rotation radius direction different from that of the first lever portion (62), and the connection engagement portion (36) includes an auxiliary engagement portion (33) configured to press the second lever portion (63) and rotate the connection member (61) by a predetermined rotation angle or more after the tip end (36a) of the connection engagement portion (36) presses the first lever portion (62) and rotates the connection member (61) by the predetermined rotation angle.

[3] The connector (inlet 1) according to [1] or [2], in which the connection member (61) is constantly urged by an elastic member (torsion coil spring 65) in a direction in which the shutter (41) closes the front opening.

According to the connector having the above configuration [1], when the mating connector is moved to the position where the fitting tip end portion faces the front opening of the housing when fitting the connector, a side surface portion of the mating connector presses the arm portion so as to rotate the rotation arm. Then, the rotated rotation arm rotates the shutter integrally with the connection member whose first lever portion is rotated by the tip end of the connection engagement portion so as to open the front opening of the housing. Therefore, if the mating connector is moved toward the front opening along the connector fitting direction while the side surface portion presses the arm portion to maintain an opening state of the shutter, a mating connection terminal of the mating connector can be fitted to the connection terminal in the front opening of the housing.

At this time, since the rotation arm rotates the shutter via the connection member, a pressing force with which the side surface portion of the mating connector presses the arm portion is smaller than a pressing force with which a fitting tip end portion of a mating connector in related art directly presses a front surface portion of a shutter.

Therefore, although insertion resistance when coupling the connection terminal and the mating connection terminal acts on the mating connector moving in the connector fitting direction when fitting the connector, rotation resistance against rotation of the shutter has almost no effect, and thus a force for fitting the connector is lower than that in the related art.

In addition, according to the connector of the present configuration, it is not necessary to lengthen a fitting hood portion of the mating connector in consideration of opening and closing trajectories of the shutter as in the shutter-mechanism-equipped connector in the related art.

According to the connector having the above configuration [2], even when a rotation angle necessary for the shutter to open and close the front opening is larger than the predetermined rotation angle of the first lever portion, the auxiliary engagement portion of the connection engagement portion presses the second lever portion so as to rotate the connection member, so that the shutter can be reliably rotated by the rotation angle necessary for opening and closing the front opening.

That is, in a case where the first lever portion comes off within a rotation radius from the tip end of the connection engagement portion when the tip end of the connection engagement portion presses the first lever portion so as to rotate the connection member by the predetermined rotation angle, the tip end of the connection engagement portion cannot further press the first lever portion to rotate the connection member. When the rotation angle necessary for the shutter to open and close the front opening is larger than the predetermined rotation angle of the connection member, the tip end of the connection engagement portion cannot rotate the shutter by the rotation angle necessary for opening and closing the front opening. However, according to the connector of the present configuration, the auxiliary engagement portion of the connection engagement portion presses the second lever portion so as to rotate the connection member by the predetermined rotation angle or more, so that the rotation arm can rotate the shutter by the rotation angle necessary for opening and closing the front opening via the connection member.

According to the connector having the above configuration [3], the shutter is urged in the direction in which the front opening is closed via the connection member that is constantly urged by the elastic member. The connection member constantly urged by the elastic member is constantly in contact with the connection engagement portion without any gap. Therefore, when the arm portion is pressed by the mating connector and the rotation arm is rotated, the connection engagement portion can quickly rotate the shutter via the connection member.

What is claimed is:

1. A connector comprising:
  a housing configured to accommodate a connection terminal;
  a shutter that is rotatably provided in the housing and is configured to open and close a front opening of the housing to which a fitting tip end portion of a mating connector is to be fitted;

a rotation arm that is disposed on one side portion side of the front opening and is rotatably supported to the housing about a rotation axis intersecting a connector fitting direction of the mating connector, the rotation arm including an arm portion that extends toward a front side of the housing relative to the rotation axis, and a connection engagement portion that extends toward another side portion side of the front opening relative to the rotation axis; and a connection member that is provided so as to be rotatable together with the shutter and includes a first lever portion that is pressed and rotated by a tip end of the connection engagement portion, wherein a pressing force of the mating connector, whose fitting tip end portion is moved to a position facing the front opening, acts on the arm portion so as to rotate the rotation arm, and thus the shutter is rotated together with the connection member rotated by the connection engagement portion so as to open the front opening.

2. The connector according to claim 1, wherein the connection member includes a second lever portion that is disposed so that the tip end of the connection engagement portion is located between the first lever portion and the second lever portion and extends outward in a rotation radius direction different from that of the first lever portion, and wherein the connection engagement portion includes an auxiliary engagement portion configured to press the second lever portion and rotate the connection member by a predetermined rotation angle or more after the tip end of the connection engagement portion presses the first lever portion and rotates the connection member by the predetermined rotation angle.

3. The connector according to claim 1, wherein the connection member is constantly urged by an elastic member in a direction in which the shutter closes the front opening.

\* \* \* \* \*